June 17, 1969     W. P. BROWN, JR     3,450,460

ITERATED ELECTRO-OPTIC PRISM DEFLECTOR ARRANGEMENT

Filed Sept. 26, 1966     Sheet 1 of 2

INVENTOR.
WILBUR P. BROWN JR.,
BY

ATTORNEY.

United States Patent Office 3,450,460
Patented June 17, 1969

3,450,460
ITERATED ELECTRO-OPTIC PRISM DEFLECTOR ARRANGEMENT
Wilbur P. Brown, Jr., Woodland Hills, Calif., assignor to Hughes Aircraft Company, Culver City, Calif., a corporation of Delaware
Filed Sept. 26, 1966, Ser. No. 581,846
Int. Cl. G02b 27/28, 17/08
U.S. Cl. 350—150      7 Claims The invention relates to an electro-optic radiation deflector arrangement having particular utility in providing large area controllable displays and which may be utilized with either conventional or laser light sources.

Display systems of the type here under consideration may be used to provide intelligence or other information to widely spaced organizational groups subject to a central command control. Heretofore, such systems primarily utilized cathode ray tubes as visual output devices. One difficulty with systems employing cathode ray tubes is the relatively small area of display. Additionally, such systems suffer from an inability to accurately reproduce color displays. They do, however, provide the required advantages of high speed, high resolution and accurate display control.

To provide displays having larger physical areas than heretofore practical in the art, many mechanical and display modes have been suggested. Most mechanical systems suffer from the defect of being unable to perform at the high speed required. Existing non-mechanical arrangements that have been devised have been found to be extremely expensive in initial cost and unwieldy in operation.

One form of non-mechanical system that may be utilized to provide large area display with a color capability is an iterated electro-optical prism arrangement. Electro-optical prisms are well known in the art and generally comprise, as seen in cross-section, triangular prisms of specific materials which refract a light beam passing therethrough. These materials have an additional quality in that upon the application of an electric field to opposed ends of the prism, the refraction index thereof changes in proportion to the field applied and, as a result, the deflection of the light beam passing therethrough is varied. Patently, by appropriate control of the field applied to the electro-optic prism, deflection control results. Thus, the exiting light beam may be selectively focused on any of a plurality of points in a display area. Characteristically, an electro-optical prism or prism system deflects a beam along one line only and, therefore, to achieve two-dimensional light beam disposition on a display area requires that a plurality of optical systems be placed in optical series. The planes of deflection must be in perpendicular relationship to each other, and, with coordinated control of the respective systems, a two-dimensional display area may be scanned in either a raster or random mode.

Iterated electro-optical prism arrangement comprise a plurality of electro-optical prisms placed adjacent each other and in optical series relation with each other. The C axes of the juxtaposed prisms are arranged in parallel and alternate directions to achieve the desired effect. Electrical fields, which are controllable, are applied to opposed surfaces at the respective prisms and thereby a controlled and variable deflection of the light beam being propagated therethrough is achieved. A practical disadvantage of prior art iterated electro-optical prism deflector arrangement is excessive length. That is, the high deflection high resolution (resolution being defined as the number of resolvable spot positions on the display) needed for large area displays requires an extremely long structure comprising a great number of individual prisms. Each prism, of course, is extremely expensive, hence, the cost of prior art devices was generally prohibitive for most service applications. It is also well known that the amount of electrical power required to drive such a device is directly proportional to the length of the arrangement, hence, large driving power sources were required in the conventional prior art iterated prism arrangements.

The present invention has as a primary objective the utilization of a folding technique which may substantially reduce the total length of a useful iterated electro-optical prism system and yet achieves the high deflection required in the mentioned service application.

As a result of achieving the object noted, the initial cost of the system is substantially reduced and its operating expense equally importantly reduced as a relatively low driving power is required to achieve the desired deflection.

Specifically, it is an obect of the invention to provide a plurality of electro-optical prisms arranged in adjacent juxtaposition. One or more mirror or reflecting devices are positioned at an end or ends thereof so that a propagated light beam may be repeatedly passed through respective prisms and finally into an optical focusing system achieving the desired deflection. In effect, the propagated beam is "folded" and passed through a given electrical optical arrangement a plurality of times before area display.

It is a further object of the invention to provide a mode of compressing a propagated beam in a plane perpendicular to the deflection plane while maintaining its original physical dimension in the deflection plane and thereby increase the efficiency of the beam folding process. This decreases the thickness of the prisms required and increases the number of passes or folds of a beam that may be made through a prism arrangement of fixed dimension. The invention further incorporates structure for re-sizing the beam prior to display.

Yet another object of the invention is to include within the combination, described above, means to rotate the polarization of the beam prior to folding and deflection and to further rotate the beam upon exit from the electro-optical deflector, whereby at least one order of folding within the electro-optical system may be achieved.

These and other advantages and features of the invention will become apparent in the course of the following description and from an examination of the related drawings wherein.

Figure 3:
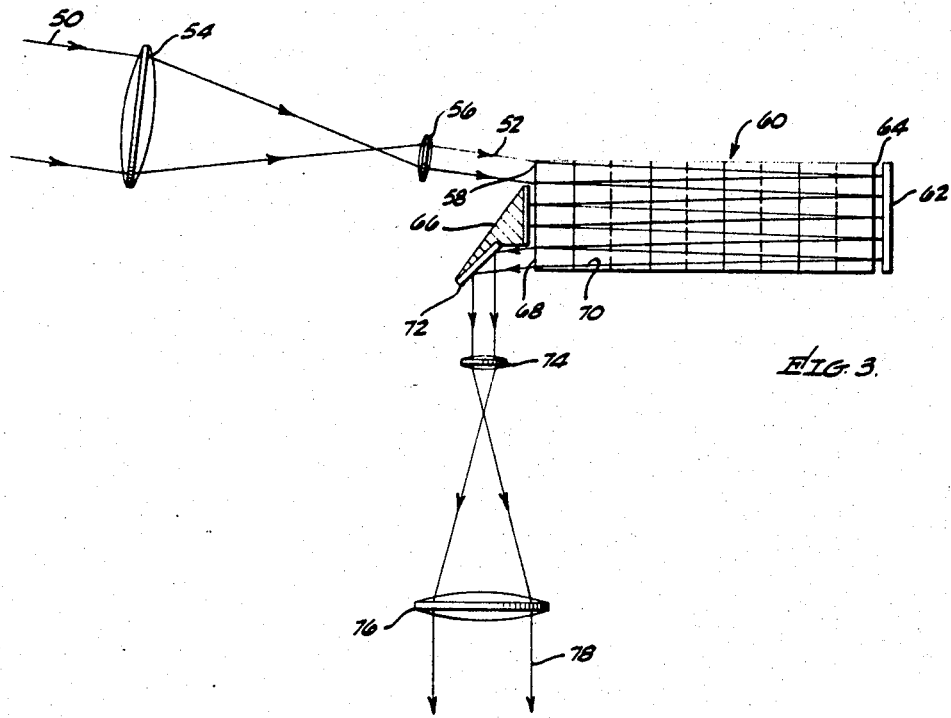
Figure 4:
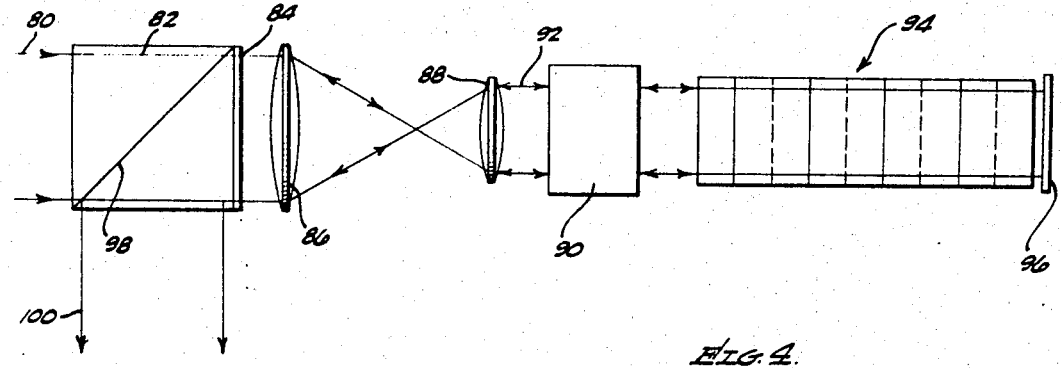

FIG. 3 is a plan view of a presently preferred embodiment of an iterated electro-optical beam folding prism arrangement coupled with beam compressing optics which may provide, in theory, beam folding and duplication to the $n$th order; and FIG. 4 is a plan view, partially schematic, of an alternate arrangement for achieving at least one order of beam folding in an electro-optical prism arrangement.

As will be well known to persons experienced in this field, iterated electro-optical prism systems utilize crystalline prisms of particular materials which not only have the capacity to refract a light beam passing therethrough, but also possess the quality of being able to provide a variable index of refraction upon the application of an electric field to opposed surfaces on the prism crystal. The change in index of refraction of the prism when an electrical field is applied is a characteristic of ferroelectric crystals. There are several crystals currently available which provide the quality described. One of the most practical is that material known as KDP and its isomorphs which has been found to be of high optical quality and readily and economically available. Specifically, KDP is a crystalline structure more accurately known as potassium dioxide hydrogen phosphate but will be referred to herein by its conventional designation KDP. It will be understood, however, that the invention disclosed may reasonably employ other electro-optical materials.

Figure 1:
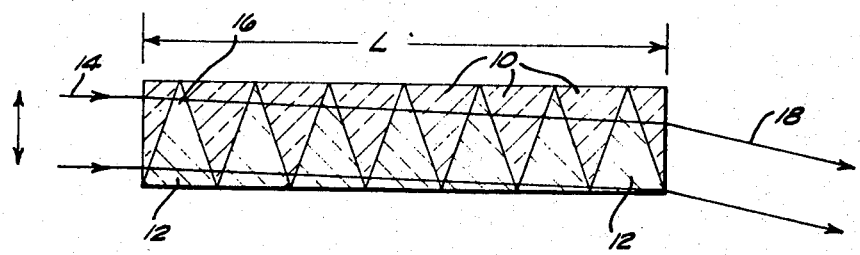
FIGURE 1 is a side-elevational view, partially schematic, of a conventional iterated electro-optical prism system.

FIG. 1 is illustrative of a typical prior art iterated electro-optical prism arrangement. A plurality of prisms 10, 10, are arranged in physical adjacency to each other with the C axes alternately directed into and out of the plane of the figure. Electric leads 12, 12, may be used to apply voltages to set up appropriate electrical fields to opposed surfaces of the prism arrangement. Of course, the opposed surfaces of the prisms must be coated with an appropriate conventional electrically conductive material which will accept the voltage. A well known alternate arrangement may be used, i.e., the prisms may be arranged with the C axes uniformly directed, e.g., into the figure. This, however, requires that each prism 10 be provided with an electrically independent field and has the disadvantage of setting up an interfering field on each side of the arrangement.

A light beam indicated at 14 enters the system at the left-hand face thereof and is progressively refracted to point of exit at surface 16, whereat a maximum deflection is indicated by the direction of exiting beam 18. The specific beam deflection for any system is conventionally controllable by controlling the electrical fields applied to the specific prisms within the system and therefore the exiting beam may be controllably deflected within the plane of the figure.

As earlier noted, this type of system is extremely expensive because of the multiplicity of individual prisms required to achieve the resolution necessary in the large area display applications contemplated. Additionally, a high amount of driving power is required because of the multiplicity of prism units.

Figure 2:
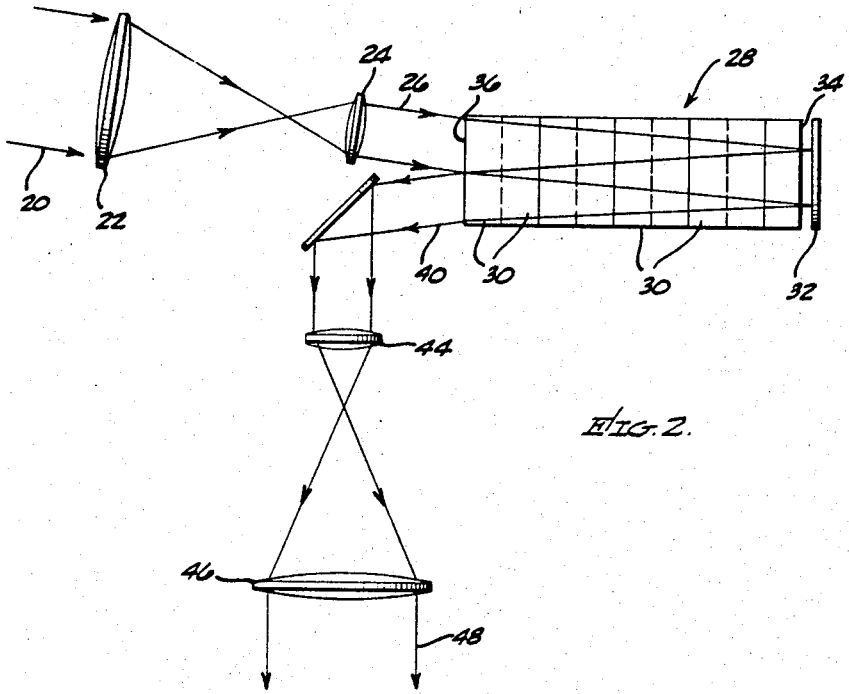
FIG. 2 is a top plan view, partially schematic, of a prism system and its associated optics providing one order of beam folding and beam compression.

Directing attention to FIG. 2, a first order folding of the propagated beam is here illustrated. A propagated beam is shown at 20 which enters an optical system comprising lenses 22 and 24 which compress the beam in a direction perpendicular to the plane in which the light beam is to be deflected. Thus a rather large cylindrical beam 20 having a uniform circular cross section leaves lens 24 as rectangular beams 26 having been compressed in the plane of the figure to reduce the vertical size thereof. An iterated electro-optical prism arrangement is indicated generally at 28 and comprises prisms 30, 30, physically arranged as earlier described. A first reflecting mirror 32 is placed adjacent the exit surface 34 of the system 28. The beam 26 enters the system 28 via surface 36 and receives a first magnitude of deflection and exits the system at 34 to be reflected by mirror 32 back through the arrangement 28 for exit at surface 36 as shown by beam 40. On its second pass through the system 28 the beam receives a second magnitude of deflection and the total deflection of the entering beam 26 represents the sum of the deflections on each pass. The beam is said to be folded through the iterated electro-optical prism arrangement 28. Exiting beam 40 is reflected by mirror 42 through an optical system comprising lenses 44 and 46 which expand the beam in its compressed dimension and an output beam 48 is achieved equal in size and configuration to input beam 20. It is specifically noted that when the beam is compressed in a direction perpendicular to the plane of deflection, the ultimate resolution thereof for display purposes is not affected.

FIG. 3 illustrates a folding system which may be said to describe the nth folding order. Again, an input beam 50 is provided which is compressed in one dimension to beam 52 via the optical lenses 54 and 56. The beam enters surface 58 of the iterated electro-optical prism arrangement, indicated generally at 60, and passes therethrough as a narrow beam striking the upper aspect of mirror 62 which is placed adjacent the surface 64 of the arrangement 60. A second mirror 66 covers a segment of surface 58 of the prism arrangement and receives a refracted beam from mirror 62 and in turn reflects same toward mirror 62, the folding and sequential passage of the beam through the arrangement 60 occurring any desired number of times. A small segment 68 of surface 58 is below the reflecting surface of mirror 66 and receives the folded beam 70 allowing same to exit and strike reflecting surface 72 the latter being optically aligned with lenses 74 and 76 which enlarge the compressed beam and provide an output beam 78 dimensionally equal, and of a congruent configuration, with the entering beam 50. It will thus be apparent to those skilled in the art that utilizing the structure of FIG. 3 will provide the designer with as many passes or folds of the propagated beam as is required to achieve the total deflection desired.

FIG. 4 shows a slightly modified arangemeent which may be used. In this structure a collimated input beam is shown at 80 and a Gran-Thompson prism is shown at 82. The prism 82 passes the input beam 80 as an ordinary ray, passing the latter linearly therethrough for exit at surface 84 to be passed through lenses 86 and 88 for reduction in beam size. A polarization rotator 90 is placed in optical series with the compressed beam 92 and rotates the plane of polarization of the light by 45°. The rotated light is now directed at the iterated electro-optical prism arrangement, indicated generally at 94, and passes therethrough for appropriate deflection to be reflected at the end thereof by mirror 96. Mirror 96 returns the beam through the arrangement 94 and it again eners the polarization rotator 90 for further rotation of the plane of polarization another 45°. The output beam then is re-sized at lenses 88 and 86 and enters the prism 82 as an extraordinary ray (polarization rotated 90° from the ordinary ray 80) with the result that it is reflected at angular surface 98. This is a characteristic of the prism 82. The output beam 100 which is equal in size to the input beam 80 is then projected. The uilization of the polarization rotator enables the desired deflection to be achieved by common passage of the beams of light in opposite directions through the arrangement 94.

It will thus be seen that an iterated electro-optical prism arrangement has been provided which substantially reduces the number of individual prisms required to achieve a high degree of deflection. The structure therefore achieves the total deflection required in large area display arrangements of the type referred to above. This total deflection is achieved without impairing resolution even though the beam is compressed in one of its dimensions. The beam's subsequent multi-passage through the optical deflecting arrangement, its re-sizing after transmission from the deflecting arrangement enables its ultimate projection the display area appropriately deflected and requisitely sized. The economy and utility of the devices illustrated both from initial cost standpoint and from the standpoint of power consumption during operation and as compared to prior art arrangements is though to be patent.

The invention is shown by way of illustration and not limitation and may be subject to various modifications all within the spirit and teaching thereof.

What is claimed is:

1. In an iterated electro-optic prism deflector arrangement a beam deflector comprising a plurality of electro-optic prisms in optical series juxtaposition to each other, reflection means at least at one end of the deflector arrangement, optical means to focus an input beam on one end of the deflector arrangement for passage of the beam therethrough, said reflection means being operative to reflect and return the beam through the arrangement, electrode means to apply an electric field to the arrangement and thereby control the degree of refraction of the beam as it passes through the arrangement.

2. An iterated electro-optic prism deflector arrangement according to claim 1, wherein
said optical means compresses the input beam in one plane prior to focus on said one end of the arrangement, and
other optical means to receive the refracted beam emanating from the arrangement and operative to resize the emanated beam.

3. An iterated electro-optic prism deflector arrangement according to claim 2, and including
reflection means at boh ends of said arrangement operative to reflect and induce the passage of the input beam through the arrangement a plurality of times.

4. An iterated electro-optic prism deflector arrangement according to claim 3, wherein
said input beam is focused on the arrangement at a small angle with respect to the long axis of the arrangement.

5. An iterated electro-optic prism deflector arrangement according to claim 4, and including
other reflection means to receive the beam emanating from the arrangement and operative to direct the beam to said other optical means.

6. An iterated electro-optic prism deflector arrangement according to claim 5, wherein
said juxtaposed prisms physically engage each other.

7. In a deflector arrangement
a first polarizing prism in optical series with an input-beam and operative to pass a polarized beam axially therethrough,
lens system in optical series with the first prism and operative to receive said beam and compress same in at least one plane,
a polarization rotating device optically aligned with the lens system to receive the compressed beam and rotate the polarization of same through a predetermined angle,
an iterated electro-optic prism deflector arrangement in optical series with the polarizaion rotator to receive the compressed and rotated beam and accommodate passage therethrough in one direction to provide a first refraction of said passed beam,
reflecting means adjacent one end of said prism arrangement to reflect the passed beam and return same through the prism deflector arrangement and thereby induce a second refraction of the beam,
said secondly refracted beam being arranged to emanate from said deflector arrangement and to pass through said polarization rotation device for beam polarization rotation through a second determined angle,
said lens system receiving said last-mentioned rotated beam from said rotator and being operative to resize same and focus the beam axially on said first-mentioned prism, and
said first-mentioned prism having a reflecting surface therein to direct the resized, polarization rotated beam to output.

References Cited

UNITED STATES PATENTS 3,305,292   2/1967   Miller.

DAVID SCHONBERG, *Primary Examiner.*

P. R. MILLER, *Assistant Examiner.*

U.S. Cl. X.R.

350—157, 160, 286